US010106996B2

(12) United States Patent
Erdman

(10) Patent No.: US 10,106,996 B2
(45) Date of Patent: Oct. 23, 2018

(54) BOARD HANGING DEVICE

(71) Applicant: Daniel E Erdman, Dousman, WI (US)

(72) Inventor: Daniel E Erdman, Dousman, WI (US)

( * ) Notice: Subject to any disclaimer, the term of this patent is extended or adjusted under 35 U.S.C. 154(b) by 862 days.

(21) Appl. No.: 14/566,367

(22) Filed: Dec. 10, 2014

(65) Prior Publication Data

US 2016/0052110 A1 Feb. 25, 2016

Related U.S. Application Data

(63) Continuation-in-part of application No. 29/499,755, filed on Aug. 19, 2014, now Pat. No. Des. 782,264.

(51) Int. Cl.

| | |
|---|---|
| ***B23P 19/00*** | (2006.01) |
| ***E04G 21/18*** | (2006.01) |
| ***B25B 27/00*** | (2006.01) |
| ***B25B 11/00*** | (2006.01) |

(52) U.S. Cl.
CPC .......... *E04G 21/1841* (2013.01); *B25B 11/00* (2013.01); *B25B 27/00* (2013.01)

(58) Field of Classification Search
CPC . B23P 11/00; B23P 13/00; B23P 15/00; B23P 19/04; B23P 19/10
See application file for complete search history.

(56) References Cited

U.S. PATENT DOCUMENTS

| | | | | |
|---|---|---|---|---|
| 5,054,755 A * | 10/1991 | Hawkes | B25B 5/06 269/239 |
| 5,192,059 A * | 3/1993 | Silver | B25B 5/145 269/41 |
| D336,231 S * | 6/1993 | Strom | B25B 11/00 D8/89 |
| 5,564,248 A * | 10/1996 | Callies | E04B 1/2612 403/232.1 |
| 6,126,156 A * | 10/2000 | Brodeur | B25B 9/00 269/3 |
| 6,272,951 B1 * | 8/2001 | Lambson | E04B 1/2612 269/3 |
| 7,270,356 B2 * | 9/2007 | Roderick | B25B 9/00 294/211 |
| 9,151,058 B1 * | 10/2015 | Leathe | E04B 1/2608 |
| D782,264 S * | 3/2017 | Erdman | D8/68 |
| 2010/0125996 A1 * | 5/2010 | Coffman, Jr. | B25C 3/008 29/283 |
| 2016/0052110 A1 * | 2/2016 | Erdman | B25B 27/00 29/464 |

* cited by examiner

*Primary Examiner* — Lee D Wilson
(74) *Attorney, Agent, or Firm* — Monty Simmons; Simmons Patents

(57) ABSTRACT

Disclosed are the ornamental design and utilitarian characteristics of a tool configured for associating an attachment-device (such as a joist hanger) with a structure (such as a ledger board). The tool comprises an alignment element that is placed in alignment with an edge defined by a structure so as to define an A-axis and B-axis location for associating the attachment-device to the structure.

15 Claims, 24 Drawing Sheets

Fig. 4

PRIOR ART

BOARD HANGING DEVICE

CLAIM TO PRIORITY

This application claims priority to and is a continuation in part of application Ser. No. 29/499,755, filed on 19 Aug. 2014, of which the entire contents are incorporated herein by this reference for all that it discloses for all purposes.

FIELD OF THE INVENTION

Embodiments of the present invention relate in general to the ornamental and utilitarian features for a device normally used in the field of construction for associating ("setting") an attachment-element (such as a joist hanger) with a support surface such as a ledger board.

BACKGROUND OF THE INVENTION

When constructing buildings, it is often necessary to associate two pieces of material and such task is often performed using some type of specialized hardware or attachment-element. For wood buildings, for example, it is often necessary to associate two pieces of lumber such as a joist board to a ledger board. For such tasks, attachment-elements (such as joist hangers) are often used.

Joist hangers come in many sizes to support different dimensional sizes of lumber and joists. When building a deck, for example, the prior art method of associating a joist to a ledger board using a joist hanger typically involves a first step of toenailing the decking joists into position along the wall ledger using a galvanized nail. One must be sure to associate the joist to the ledger board so that the top edge of the joist will be even with the top of the flashing on the wall ledger to create a flat/level surface. The next step is to associate a joist hanger tightly around the joist and driving "speed prongs" (provide by the joist hanger) into the ledger board to temporarily hold the joist in place. In such step it is important that one make sure the joist is sitting squarely in the joist hanger without gaps alongside and under the joist. The final step is to associate the joist hanger to the wall ledger and the joist using galvanized nails.

While such method of using a joist hanger to associate two pieces of construction material works well, there is much room for improvement regarding efficiency and consistency.

The disclosed invention relates ornamental features and well as utilitarian methods and tools for improving the efficiency and consistency of associating two pieces of construction material via an attachment-element such as a joist hanger.

SUMMARY OF THE INVENTION

Some of the objects and advantages of the invention will now be set forth in the following description, while other objects and advantages of the invention may be obvious from the description or may be learned through practice of the invention.

Broadly speaking, a principle object of the present invention is to provide a tool for associating an attachment-element with a piece of construction material.

Another object of the present invention is to provide a tool comprising a magnetic interface for associating an attachment-element with a piece of construction material.

Yet another object of the invention is to provide a tool for associating a joist hanger to a support structure.

Still another object of the invention is to provide a tool for associating an attachment-element with a piece of construction material wherein such tool provides at least one of distance data and angle/leveling data.

Another object of the present invention is to provide a method of associating a joist hanger to a support structure.

Another general object of the present invention is to provide a method of associating a joist to support structure using an attachment-element wherein a tool is used to associate the attachment-element to such support structure.

To achieve the above goals and objects of the various embodiments of the inventions, a tool is provided for associating an attachment-element (such as a joist hanger) to a structure (such as a ledger board). Such tool comprises a handle-portion and an opposing interface-portion. The handle-portion defines a handle top end and an opposing handle bottom end. Similarly, the interface-portion defines an interface-top-end and an opposing interface-bottom-end. A top-portion mechanically associates the handle top end to the interface-top-end while a bottom-portion mechanically associating the handle bottom end to the interface-bottom-end thereby defining a tool-void defined between said handle-portion, said interface-portion, said top-portion, and said bottom-portion. For one embodiment such a configuration resembles the general shape of a staple gun.

The tool further defines an alignment-element that is one of (a) integral to the bottom-portion, (b) integral to the interface-portion, (c) mechanically associated with the bottom-portion, and (d) mechanically associated with the interface-portion. Indeed, for one embodiment, the tool defines one-piece tool formed from composite materials.

The tool further defines a "gap setter" configured for setting the gap of opposing sides of said attachment-element. For example, suppose the attachment-element is a joist hanger comprising a bottom plate mechanically associated with a left side flange and a right-side flange and the distance between said flanges is the joist hanger gap. Such joist hanger gap is ideally equal (or slightly longer) than the width of the board to be inserted between such flanges. For one embodiment of the tool, the tool is configured to receive such flanges and set the gap there between. Ideally, such gap would be substantially the same distance as the width of the board to be inserted into the joist hanger so that such board fits snugly into the joist hanger. For one embodiment, the gap setter is mechanically associated with sides of said interface-portion. For yet another embodiment the "gap setter" comprises a magnetic element (such as a rare earth magnetic) associated with the interface-portion and configured to attract the flanges tight against the side of the interface portion.

The tool may be configured with tool accessories configured to provide at least one of distance data and angle/leveling data. The distance data is used to correctly space the joist hangers from adjacent structures (such as adjacent boards) and the leveling data is used to make the joist edges "level" or to provide a desired grade (a "grade" is a slight angle from level perhaps selected to allow for fluid run off away from a building).

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 24:
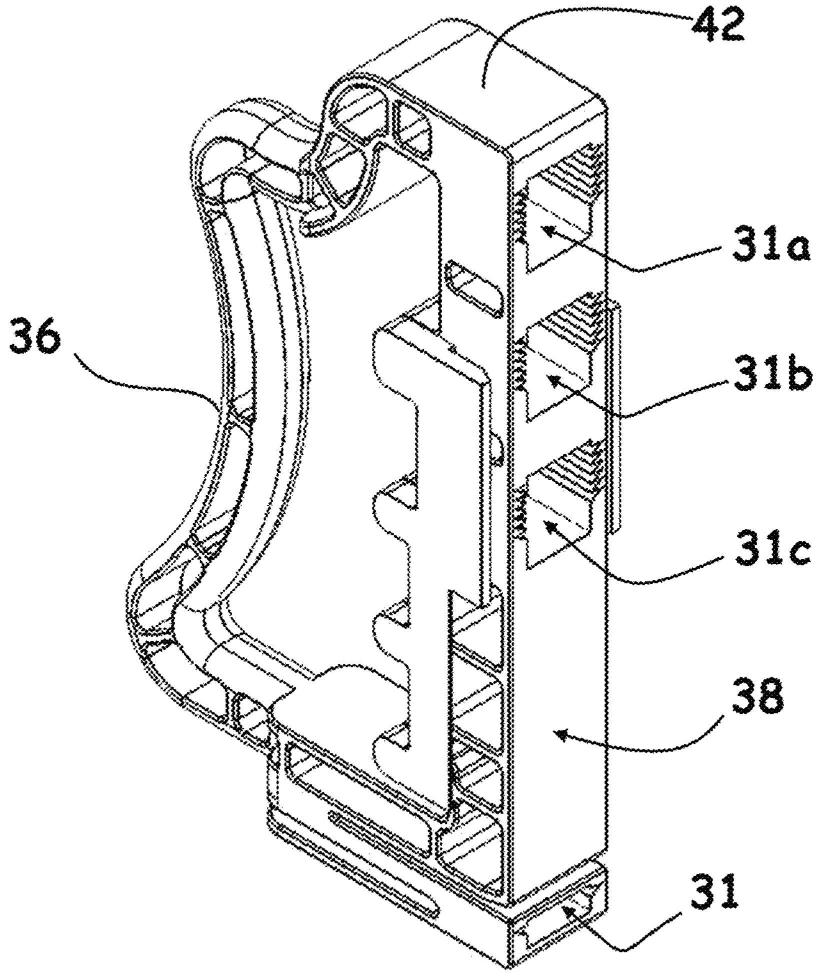
Figure 25:
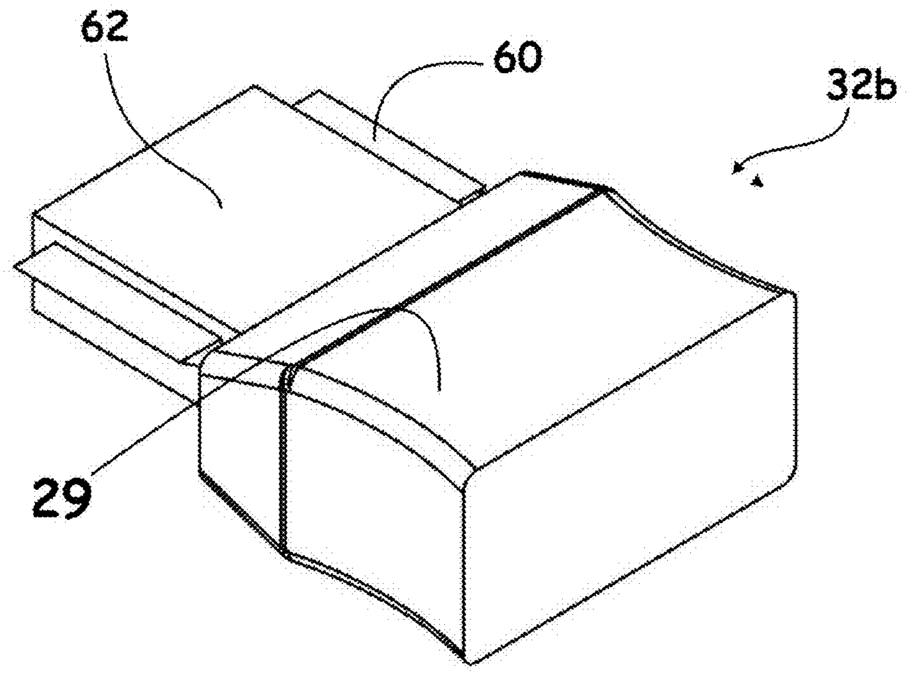
Figure 26:
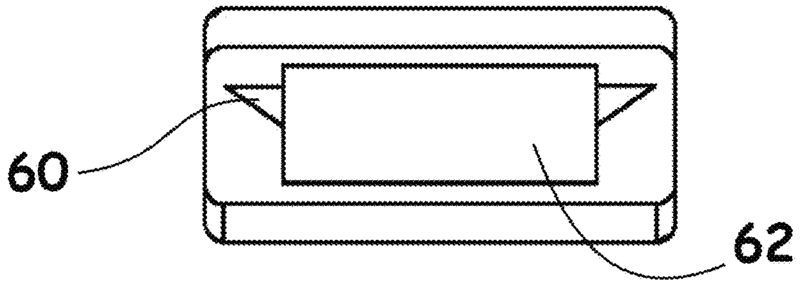
Figure 27:
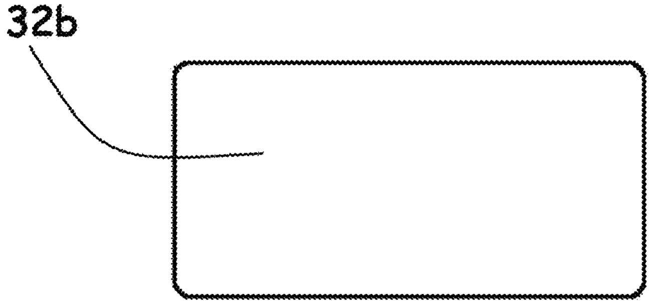
Figure 28:
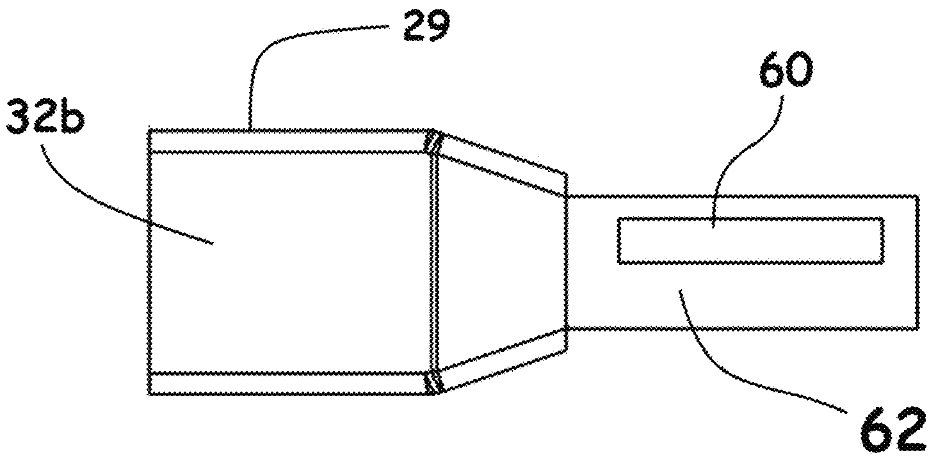
Figure 29:
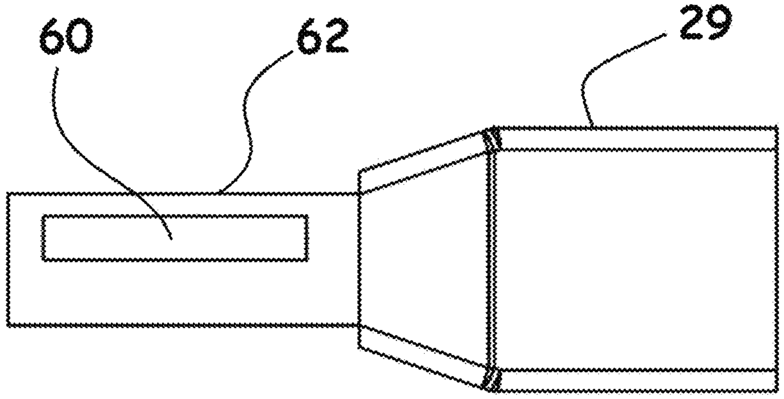
Figure 30:
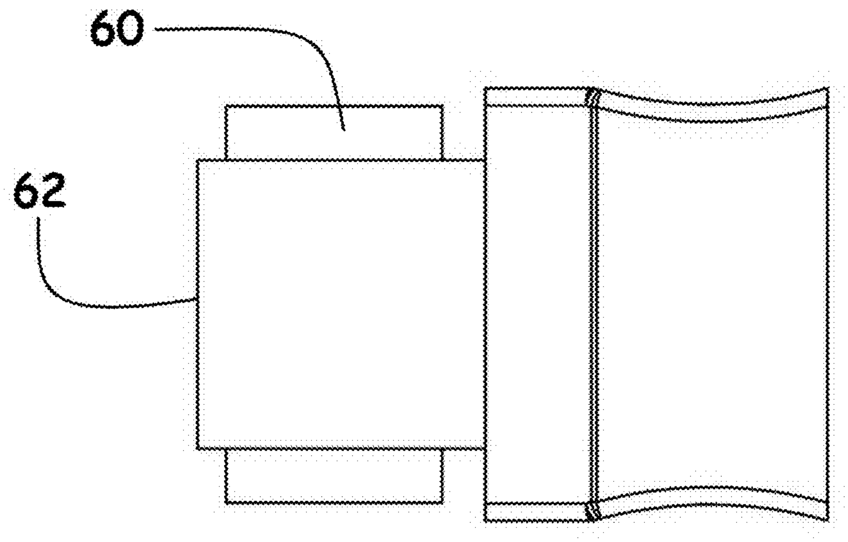
Figure 31:
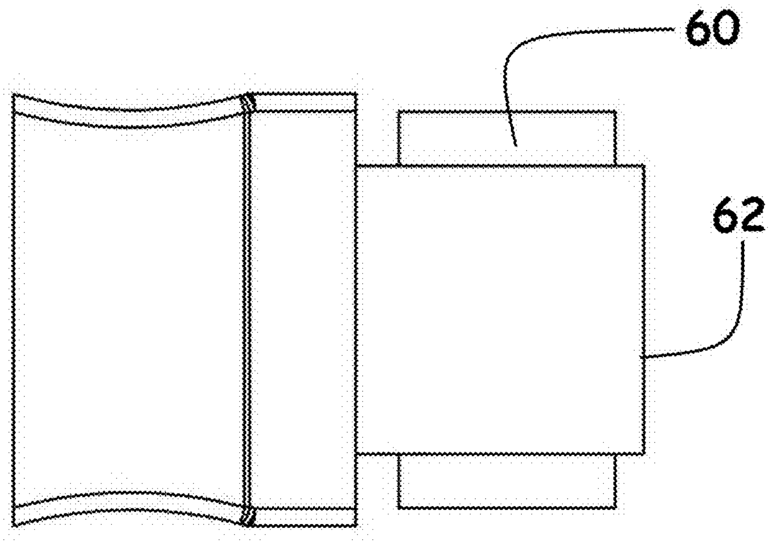
Figure 32:
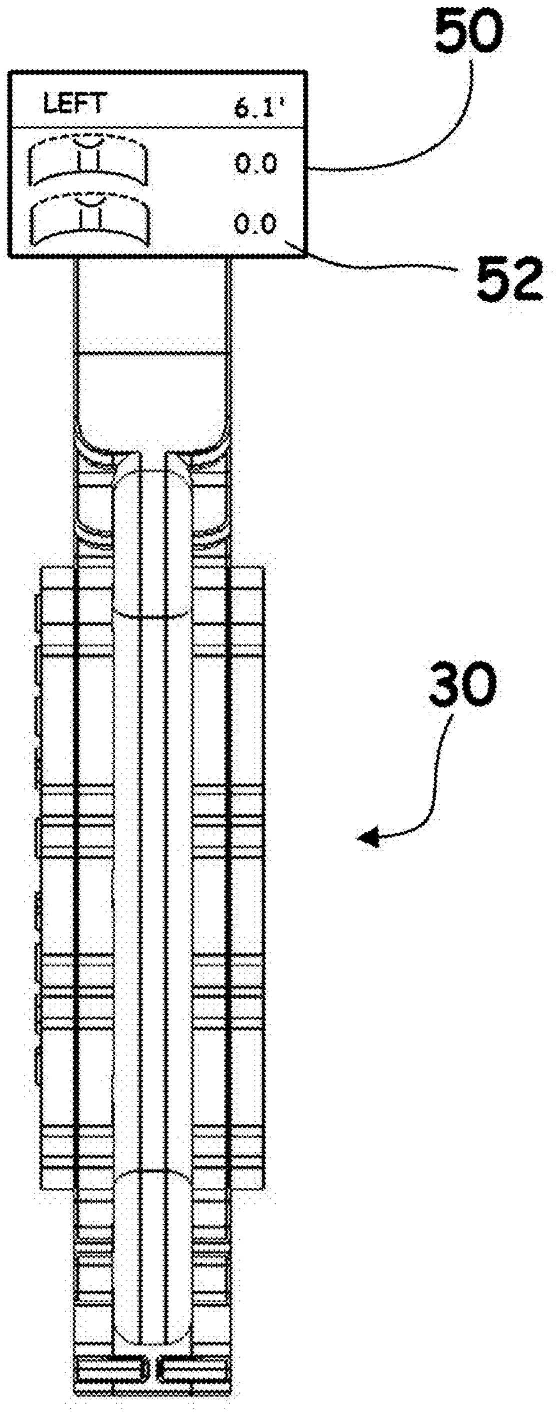
Figure 33A:
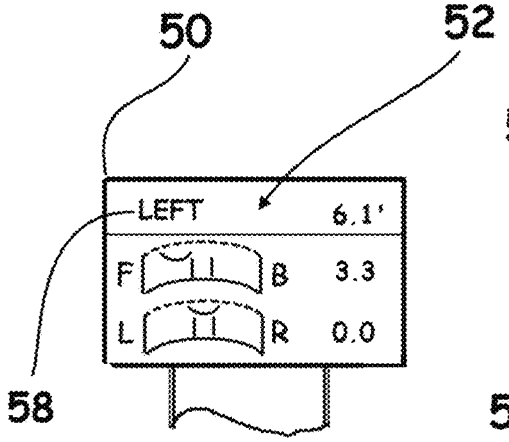
Figure 33B:
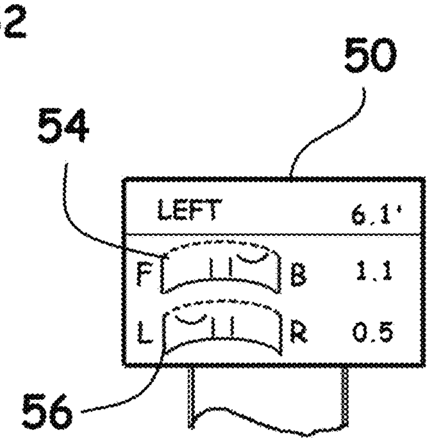
Figure 33C:
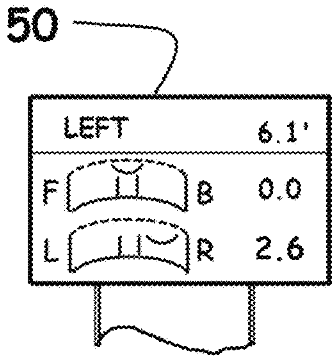
Figure 33D:
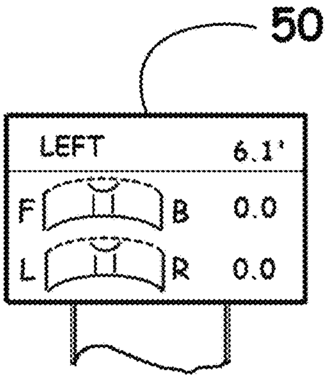

FIG. **23*b*** is a front elevated perspective view of one alternative embodiment with an adjustment-element relocated;

FIG. 24 is a front elevation perspective view of one alternative embodiment with the adjustment removed;

FIG. 25 is an elevated perspective view of one exemplary of an adjustment-element thereof;

FIG. 26 is a front elevation view of one alternative embodiment of an adjustment-element thereof;

FIG. 27 is a back-elevation view of one alternative embodiment of an adjustment-element thereof;

FIG. 28 is a right-side elevation view of one alternative embodiment of an adjustment-element thereof;

FIG. 29 is a left side elevation view of one alternative embodiment of an adjustment-element thereof;

FIG. 30 is a top plan view of one alternative embodiment of an adjustment-element thereof;

FIG. 31 is a bottom plan view of one alternative embodiment of an adjustment-element thereof;

FIG. 32 is a back-elevation view of one tool embodiment associate with an electronic module;

FIG. **33*a*** is a first close-up elevation view of the display for one embodiment of an electronic module that provides leveling data and distance date;

FIG. **33*b*** is a second close-up elevation view of the display for one embodiment of an electronic module that provides leveling data and distance date;

FIG. **33*c* is a third close-up elevation view of the display for one embodiment of an electronic module that provides leveling data and distance date; and FIG. 33*d*** is a fourth close-up elevation view of the display for one embodiment of an electronic module that provides leveling data and distance date.

Repeat use of reference characters throughout the present specification and appended drawings is intended to represent the same or analogous features or elements of the present technology. Various objects, advantages, and features of the invention will become apparent to those skilled in the art from the following discussion taken in conjunction with the drawings.

DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only and is not intended as limiting the broader aspects of the present invention.

Construction Aids

This document contains headers to provide reference points only and such headers are not intended and should not be used in any way to limit the scope of the disclosure.

For the purposes of this document two or more items are "mechanically associated" by bringing them together or into relationship with each other in any number of ways including a direct or indirect physical connection that are (a)

movable (rotating, pivoting, oscillating, etc.), (b) releasable without tools (snaps, Velcro®, zippers, buttons, etc.) (c) releasable but generally requiring a tool (screws, bolts, etc.), and (d) breakable connections (all other connections such as welding, rivets, molecular bonds, etc.). Thus, items that are simply "mechanically associated" can include any of the above while items that are "moveably mechanically associated" include only a subset of the above such as subset "(a)".

Similarly, two or more items are "electrically associated" by bringing them together or into relationship with each other in any number of ways including: (a) a direct, indirect or inductive communication connection, and (b) a direct/indirect or inductive power connection. Additionally, while the drawings may illustrate various electronic components of a system connected by a single line, it will be appreciated that such lines may represent one or more signal paths, power connections, electrical connections and/or cables as required by the embodiment of interest.

Similarly, while a module or device may be portrayed as having various built-in electronic systems configured for performing a specialized function, it should be recognized that such module or device may comprise a plurality of physically separated but cooperatively associated electronic devices that are not shown independently such as a radiofrequency transmitter and receiver, light generators including lasers, a processor, one or more display means, magnetic sensor/readers, an sound generators, and the like, which are ideally communicating with or under control of the a central processing device.

The examples in this document relate to the task of associating two wooden components together using an attachment-element (e.g. associating a joist to a ledger board via a joist hanger). It should be appreciated, however, that such tool can be used to associate any type of attachment-element to any type of support structure constructed from any type of material without departing from the scope and sprit of the invention.

Description

Figure 1:
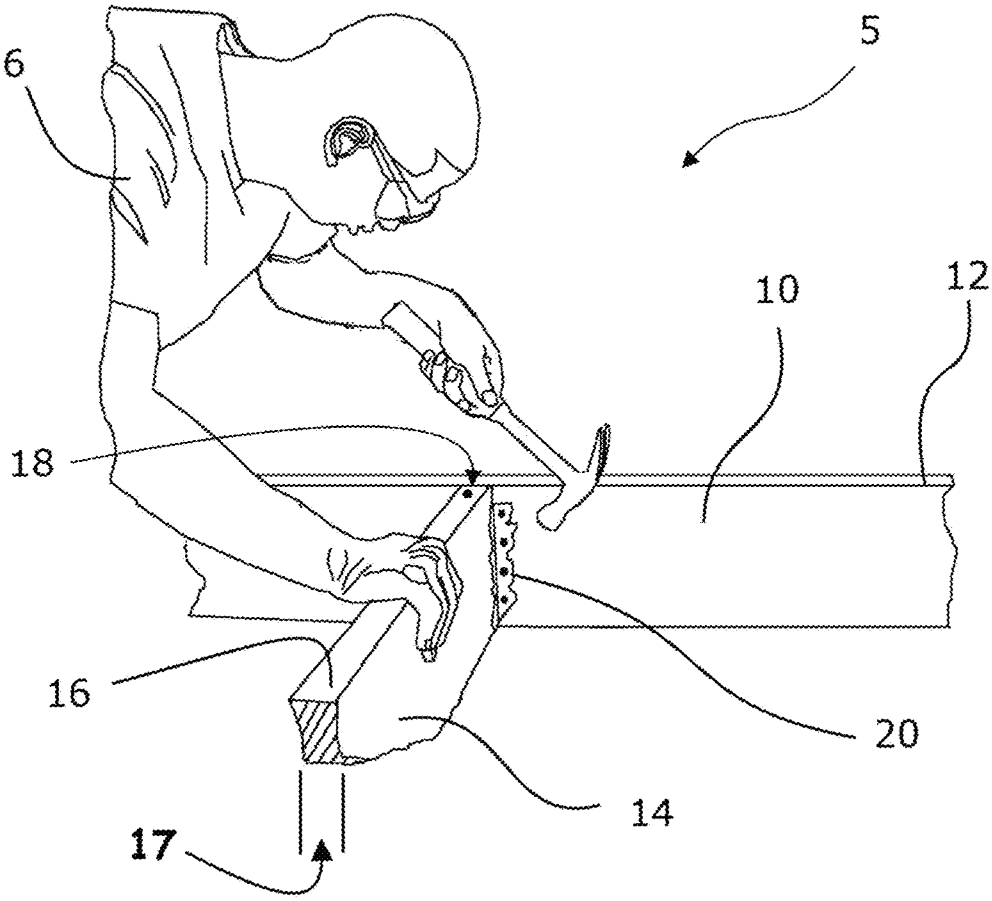
FIG. 1 depicts a prior art method of associating a joist with a ledger board.

Referring now to FIG. 1, a carpenter (6) is presented associating two wooden components (first structure (10) and second structure (14)) together using an attachment-element (20) according to one exemplary prior art method. For such example, first structure (10) is a ledger board and second structure (14) is a joist and attachment-element (20) is a joist hanger. Carpenter (6) first "toenails" a joist (14) using nail (18) to ledger (10) being careful to associate the joist to the ledger board so that the joist top edge (16) is level with the ledger top edge (12). The next step is to associate a joist hanger (20) tightly around the joist (14) and then drive speed prongs (21, FIG. 3) into the ledger board to temporarily hold the joist (14) in place (while making sure the joist is sitting squarely in the joist hanger without gaps alongside and under the joist). The final step is to associate the joist hanger (20) to the wall ledger (10) and the joist (14) by driving nails into predefined holes defined by the joist hanger.

Referring now to FIG. 2 through FIG. 10, one exemplary embodiment of tool (30) configured for associating an attachment-element (20, FIG. 3) to a first structure (12) is presented. For the currently preferred embodiment, tool (30) comprises a handle-portion (36) and opposing interface-portion (38) defining width (38*w*, FIG. 6). The handle-portion (36) defines a handle top end (36*a*) and an opposing handle bottom end (36*b*) and the interface-portion (38) further defines an interface-top-end (38*a*) and an opposing interface-bottom-end (38*b*).

Figure 4:
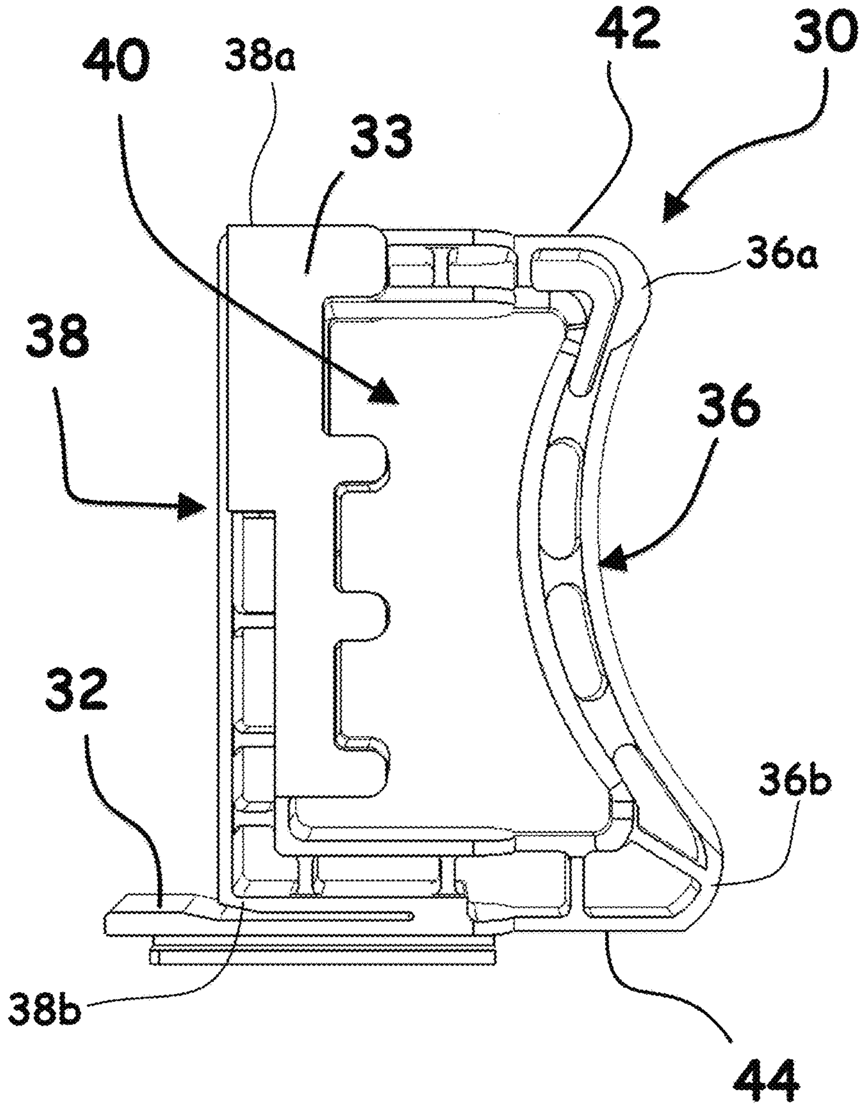
FIG. 4 is a left side elevation view of one embodiment of a one-piece integral tool apparatus.
Figure 5:
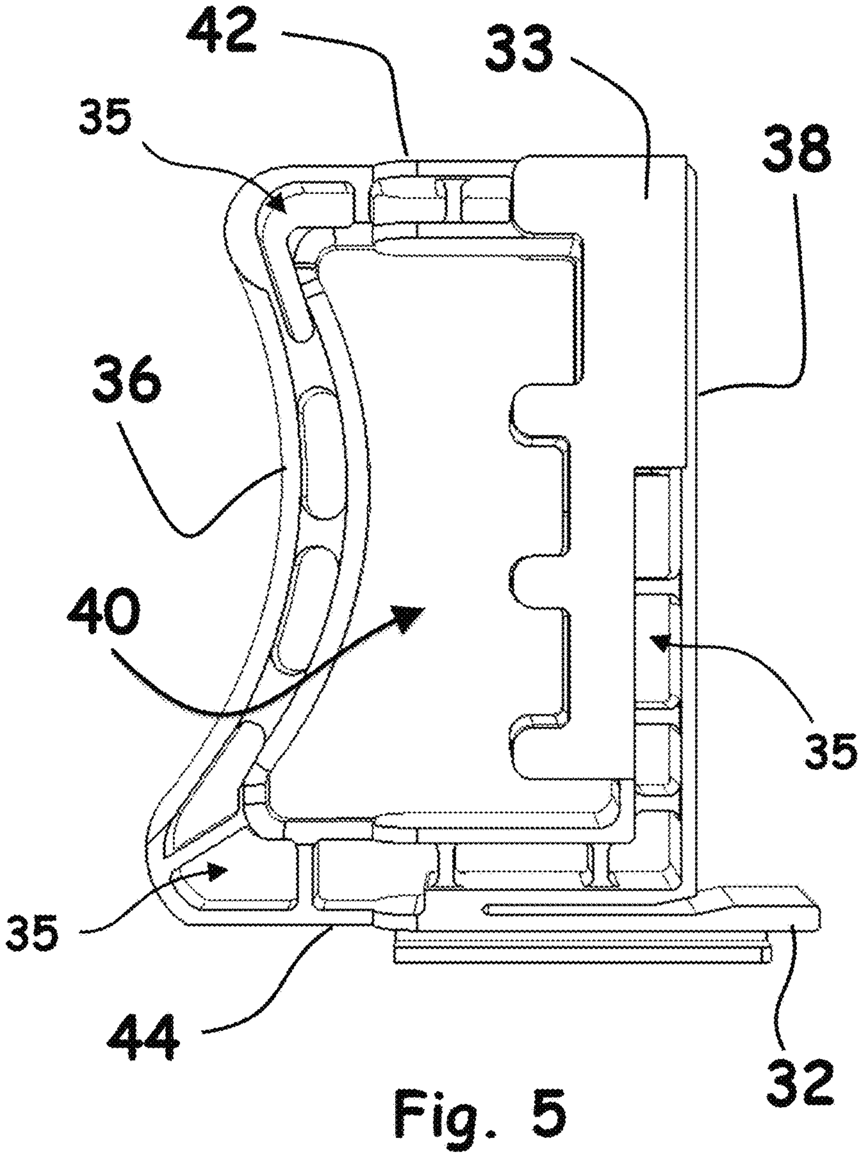
FIG. 5 is a right-side elevation view thereof.

Tool (30) further comprises top-portion (42) and bottom-portion (44) wherein said top-portion (42) mechanically associates handle top end (36*a*) to interface-top-end (38*a*) and bottom-portion (44) mechanically associates handle bottom end (36*b*) to the interface-bottom-end (38*b*). As shown in FIG. 4, a tool-void (40) is defined between the handle-portion, interface-portion, top-portion, and the bottom-portion.

For the exemplary embodiment depicted in FIG. 4-FIG. 10, an alignment-element (32) is defined by, and is integral to, the bottom-portion and extends perpendicularly away from the interface-portion (38). Such alignment-element (32) may be (a) integral to said bottom-portion, (b) integral to said interface-portion, (c) mechanically associated with said bottom-portion, and (d) mechanically associated with said interface-portion.

It will be appreciated that for the currently preferred embodiment, as depicted in FIG. 4 through FIG. 10, the tool, including the alignment-element, is molded from a composite material to define one integral component. That said, for one alternative embodiment, any combination of the various portions may be any number of separate components that are mechanically associated together to form tool (30). Notably, the handle-portion, interface-portion, top-portion, and bottom-portion each define a plurality of portion-voids (35, FIG. 5). Such portion-voids reduce the amount of material required to form tool (30) an also reduces the tool's weight and may define interfaces for receiving/storing items.

Figure 6:
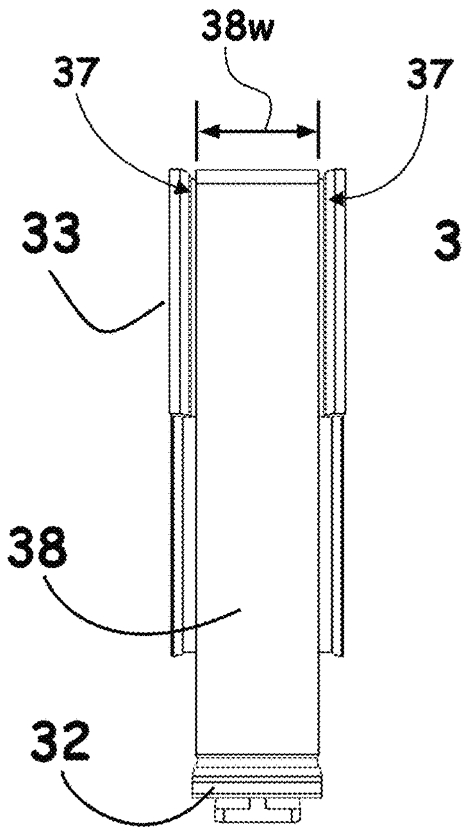
FIG. 6 is a front elevation view thereof.
Figure 7:
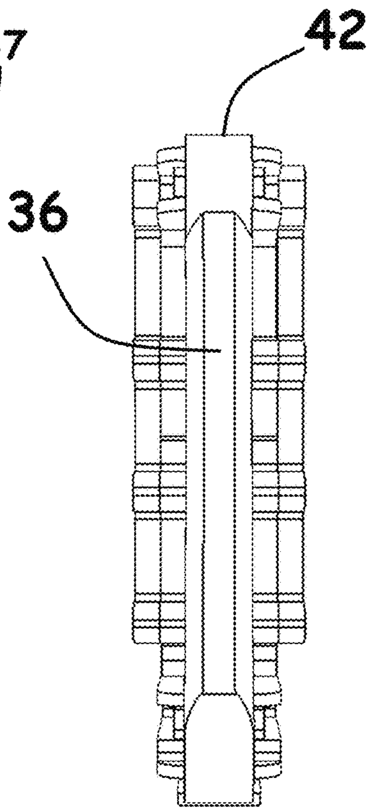
FIG. 7 is a back-elevation view thereof.
Figure 8:
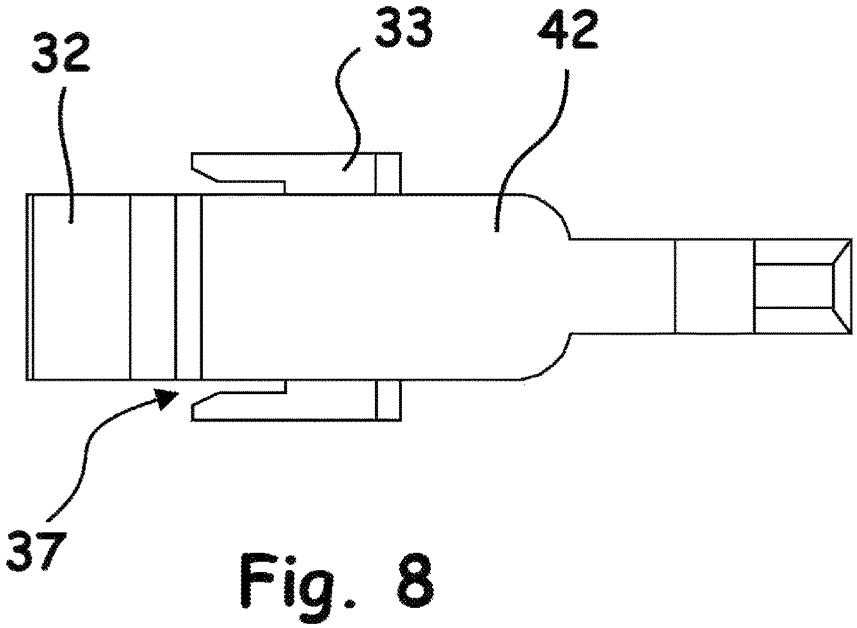
FIG. 8 is a top plan view thereof.
Figure 9:
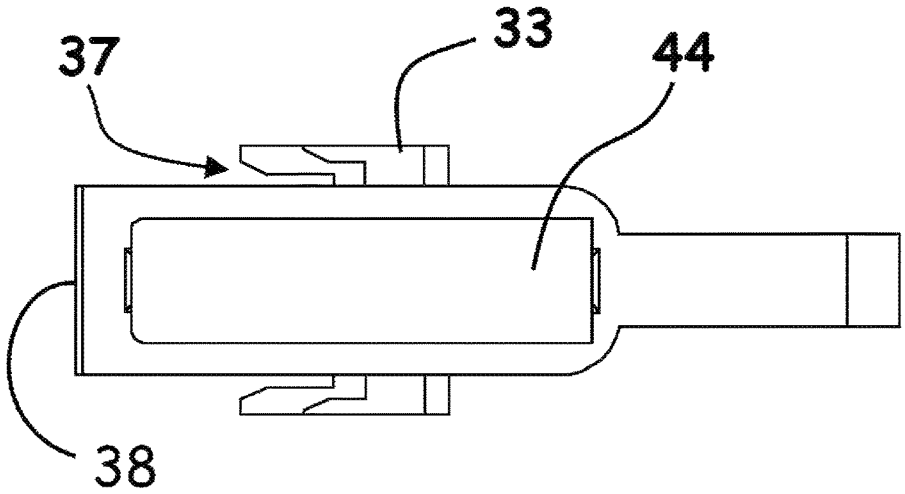
FIG. 9 is a bottom plan view thereof.
Figure 10:
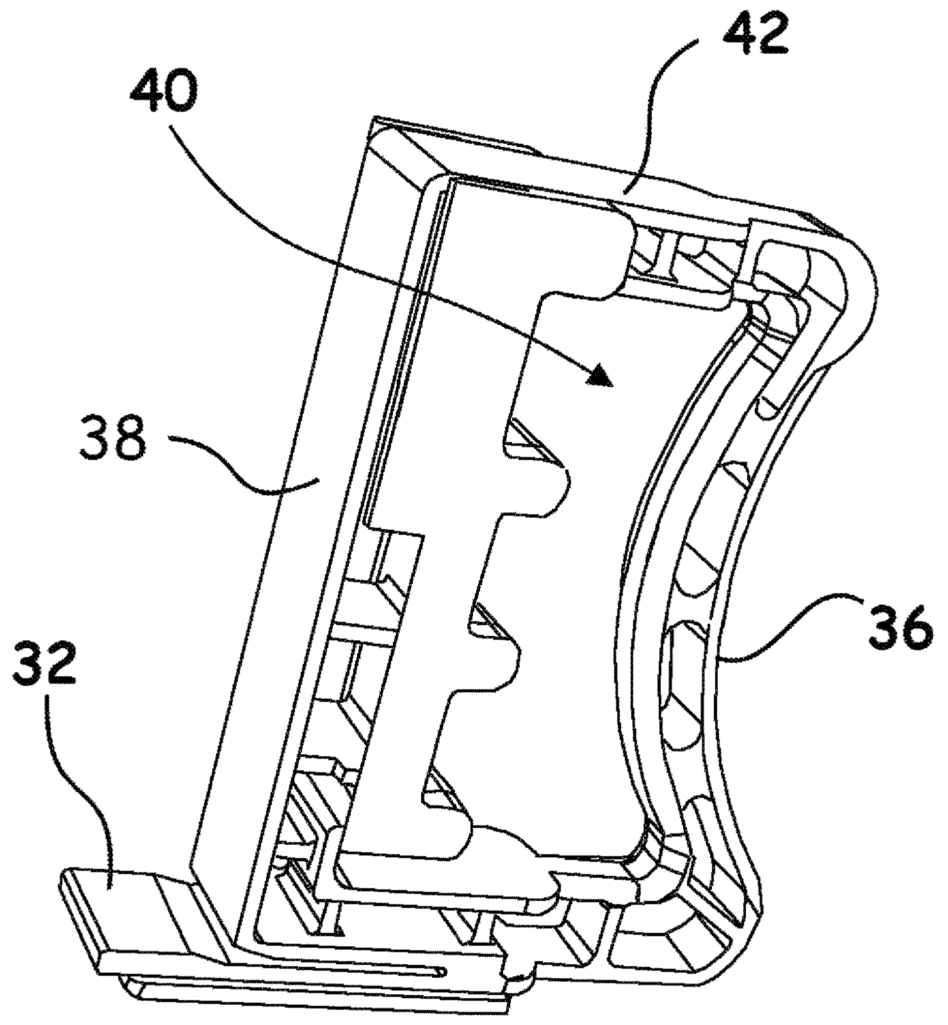
FIG. 10 is an elevated perspective view thereof.

For the currently preferred embodiment, running along the sides of interface-portion (38) are gap-setters (33) defining slots (37) configured to maintain a desired flange gap (25, FIG. 3) (described in more detail below). As best seen in FIG. 6, interface-portion (38) defines a flat surface having an interface-portion-width (38*w*) that is about equal to the flange gap (25) defined by attachment-element (20). One of ordinary skill in the art will appreciate that flange gap (25) will be equal to or slightly wider than the width (17) of second structure (14, FIG. 1). Stated differently, interface-portion (38) preferably defines an interface-portion-width (38*w*) that is substantially equal to the width (17) defined by second structure (14). Gap-setters (33) define slots (37) configured to receive and hold the attachment-element (20) flanges (i.e. flange (23*a*) and flange (23*b*) FIG. 3) adjacent to interface-portion (38) to maintain the desired flange gap. Notably, gap-setters (33) may define a magnetic element (such as a rare earth magnet) associated with a portion-void (35) defined by interface-portion (38). Such magnetic element would attract and hold the flanges against the sides of interface-portion (38*b*).

Figure 2:
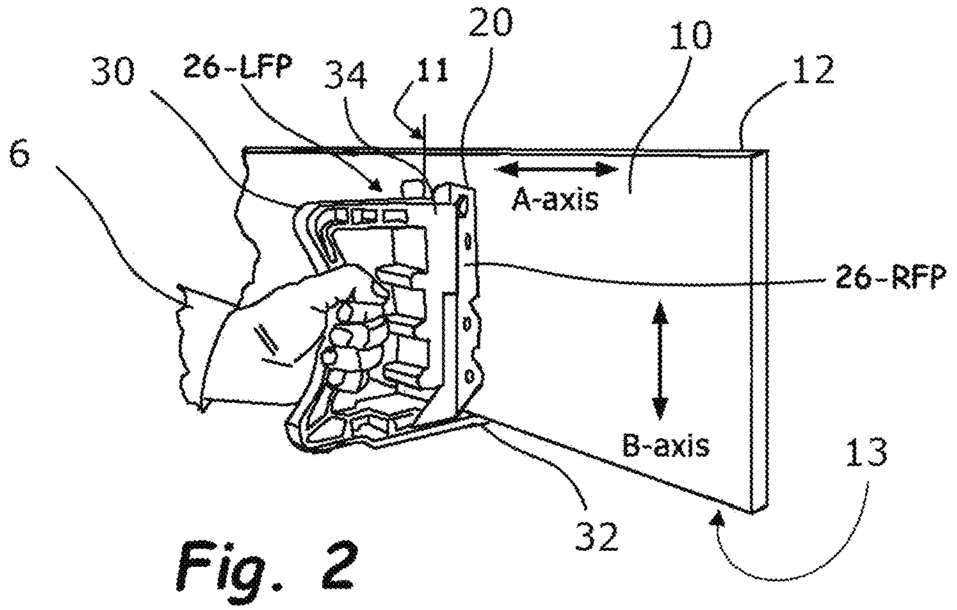
FIG. 2 presents an image of a joist hanger being associated with a ledger board using one embodiment of the disclosed tool apparatus.
Figure 3:
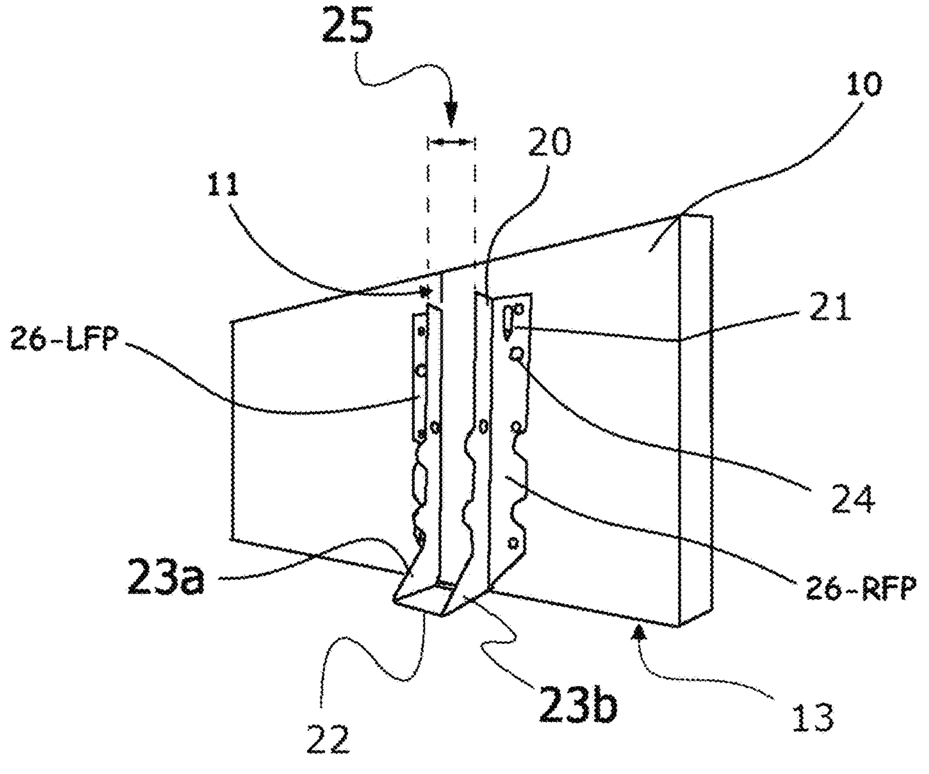
FIG. 3 presents an image of a joist hanger that has been associated with a ledger board using a disclosed tool apparatus.

In fact, one of ordinary skill in the art will further appreciate that where the attachment-element (20) is a joist hanger comprising a bottom plate (22) mechanically associated with a left side flange (23*a*) and a right side flange (23*b*) as depicted in FIG. 3, the gap setter (33) is configured to receive such flanges so that joint hanger bottom plate (22) is in alignment with said alignment-element (32) when the attachment-element is associated with tool (30) as depicted FIG. 2.

Tool Accessories

Figure 14:
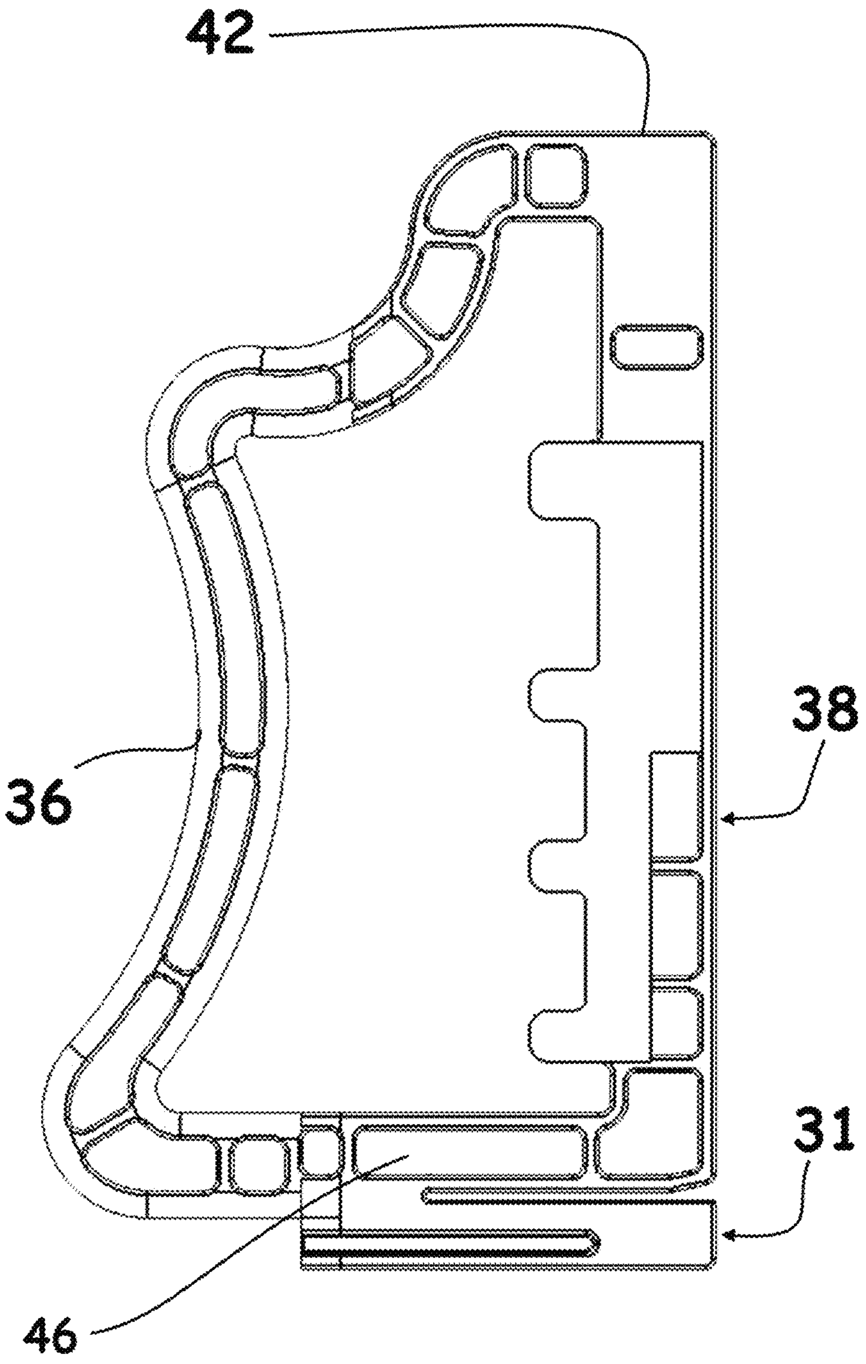
FIG. 14 is a right-side elevation view of one alternative embodiment with the adjustment-element removed.
Figure 15:
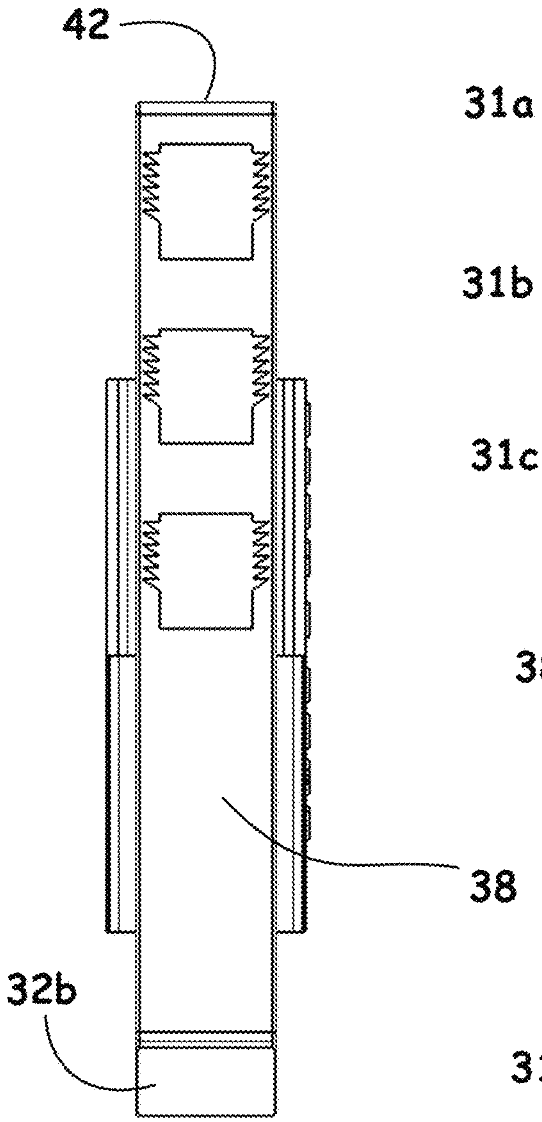
FIG. 15 is a front elevation view of one alternative embodiment with an adjustment-element thereof.
Figure 16:
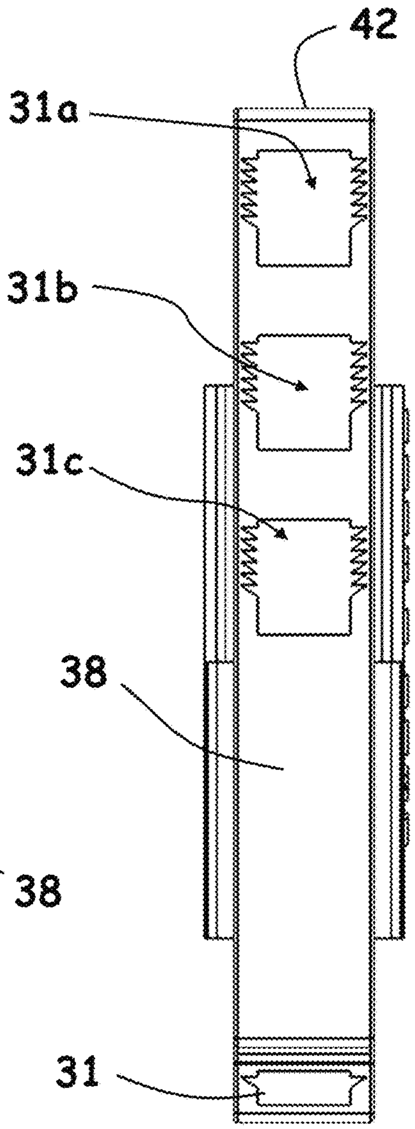
FIG. 16 is a front elevation view of one alternative embodiment with the adjustment-element removed.
Figure 17:
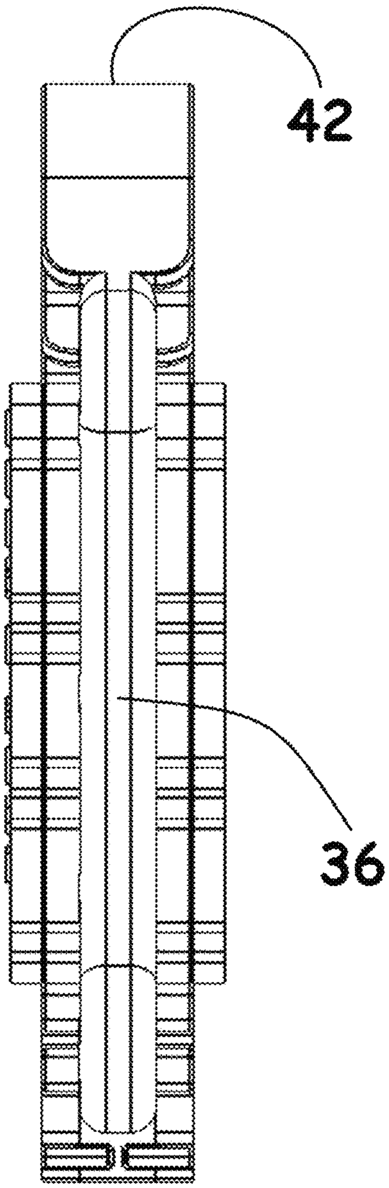
FIG. 17 is a back-elevation view of one alternative embodiment with an adjustment-element thereof.
Figure 18:
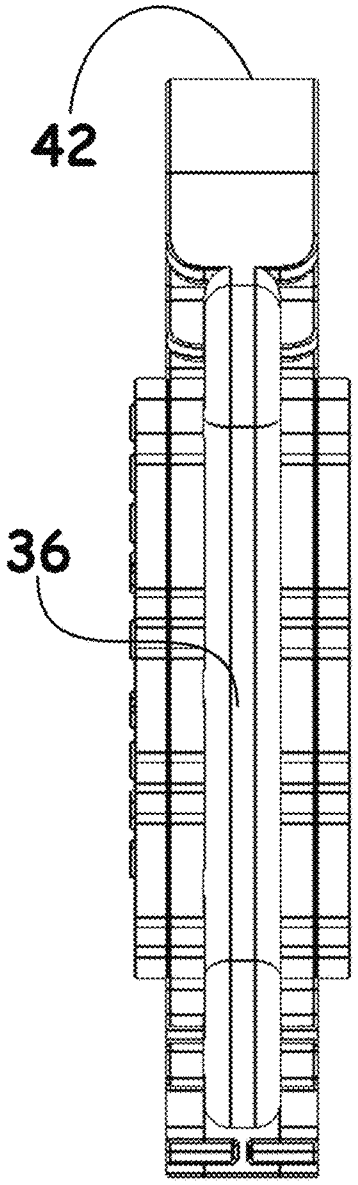
FIG. 18 is a back-elevation view of one alternative embodiment with the adjustment-element removed.
Figure 19:
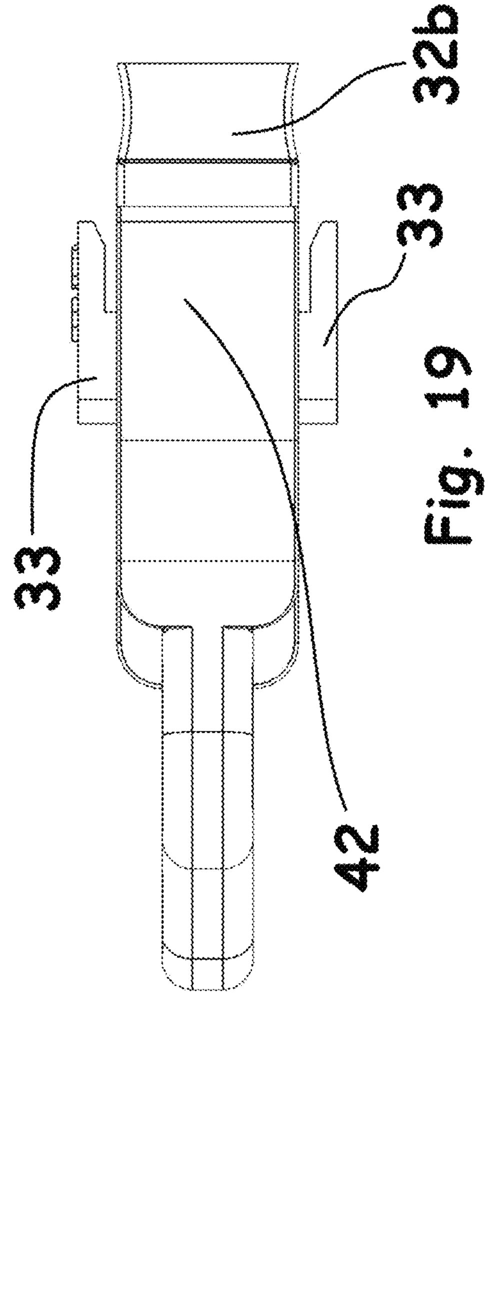
FIG. 19 is a top plan view of one alternative embodiment with an adjustment-element thereof.
Figure 20:
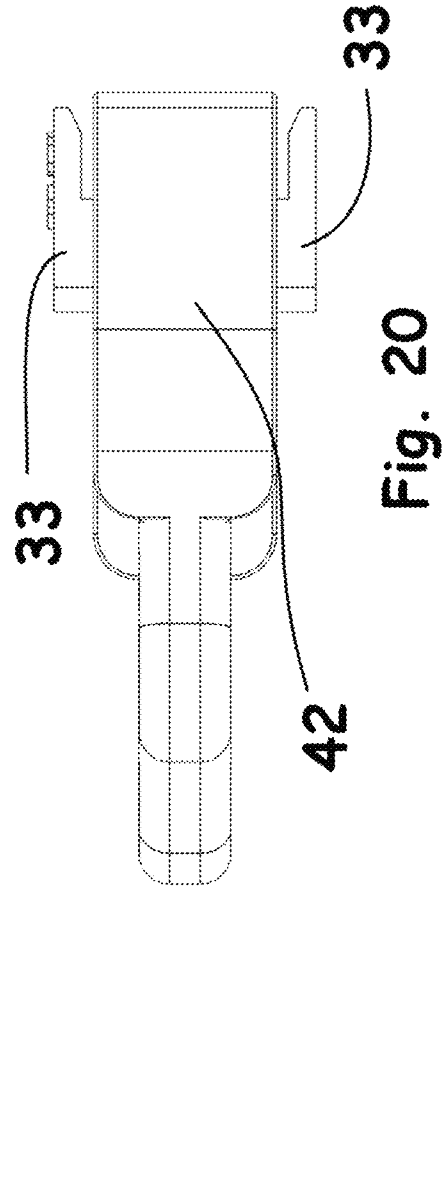
FIG. 20 is a top plan view of one alternative embodiment with the adjustment-element removed.
Figure 21:
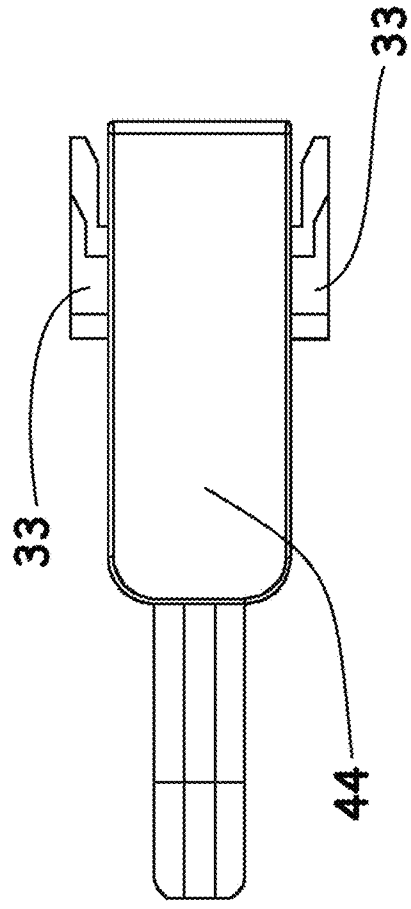
FIG. 21 is a bottom plan view of one alternative embodiment with an adjustment-element thereof.
Figure 22:
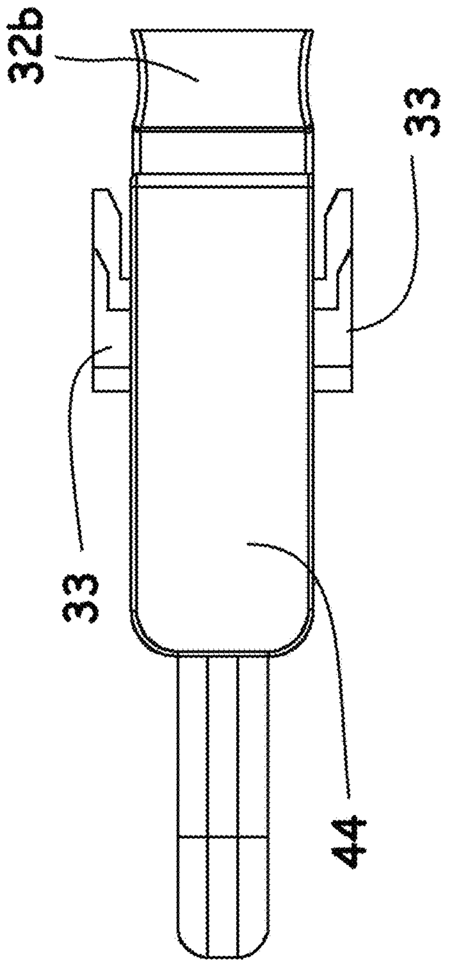
FIG. 22 is a bottom plan view of one alternative embodiment with the adjustment-element removed.

As best seen in FIG. 32 and FIG. 33, electronic measurement module (50) defines one tool accessory configured for being mechanically associated with tool (30) to provide measurement data including leveling data and distance data. Yet another tool accessory is magnetic element (46) configured for being associated with a portion-void as depicted in FIG. 14. Such magnetic element (46) may be a rare earth magnet that is suitable for holding ferrous objects such as nails, screws, drill bits, etc. and can be further used to stow tool (30) against a ferrous object.

Electronic module (50) is preferably configured to provide leveling data. A first leveling data relates to the vertical alignment of first structure (10, such as a ledger board). As depicted in FIG. 33*a*-FIG. 33*d*, for one preferred embodiment electronic module (50) is configured with a display (52) to provide a structure-alignment gauge (54) configured to provide an indication of whether or not the first structure is in vertical alignment with the gravity. The structure-alignment gauge (54) defines an "F" forward tilt, a "||" plumb/vertical indicator, and a "B" backward tilt indicator. As depicted in FIG. 33*a* and FIG. 33*b*, structure-alignment gauge (54) may also provide a digital readout of the alignment angle such as the 1.1 degrees tilt back as indicated in FIG. 33*b*.

A second leveling data relates to the vertical alignment of the attachment-element (20) relative to a surface/edge of first structure (10). For such currently preferred embodiment, display (52) further provides an attachment-element-alignment gauge (56) to provide an indication of whether or not the attachment-element (20) is in vertical alignment with a surface/edge defined by first structure (10). The attachment-element-alignment gauge (56) defines an "L" left tilt, a "||" plumb/vertical indicator, and an right tilt indicator. Attachment-element-alignment gauge (54) may also provide a digital readout of the alignment angle such as the 0.5 degree Left Tilt as indicated in FIG. 33*b*.

For such feature, interface-portion (38) is placed flat against the appropriate surface of first structure (10) (as depicted in FIG. 2). If the structure (10) and attachment-element (20) are both in vertical alignment, display (52) provides the leveling data depicted in FIG. 33*d*.

If the top edge of structure (10) and bottom edge of structure (10) are not in vertical alignment with gravity and the top edge tilts away from tool (30) the level icon is shifted to the "F" position (FIG. 33*a*) and a digital value is given (e.g. 3.3. degrees). If the bottom edge of structure (10) tilts away from tool (30), the level icon is shifted to the "B" position (FIG. 33*b*) and a digital value is given (e.g. 0.5 degrees). If the top edge and bottom edge of first structure (10) are in vertical alignment with gravity, structure-alignment gauge (54) indicates a plumb/vertical alignment as depicted in FIG. 33*c* and FIG. 33*d*. Such data allow one to establish a grade if desired.

Similarly, for the attachment-element (20), if the top edge of the attachment-element (20) is to the left of the bottom edge of the attachment-element (20), the attachment-element (20) is said to tilt to the left and attachment-element-alignment (56) icon is shifted to the "L" position (FIG. 33*b*) and a digital value is given (e.g. 0.5 degrees). If the top edge of the attachment-element (20) is to the right of the bottom edge of the alignment-element (20), the attachment-element (20) is said to tilt to the right and attachment-element-alignment (56) icon is shifted to the "R" position (FIG. 33*c*) and a digital value is given (e.g. 2.6 degrees).

For yet another alternative embodiment, electronic module (50) is preferably configured to provide distance data. For the currently preferred embodiment, a distance sensor determines the distance to an adjacent structure. Such sensor can be sound or electromagnetic based, (e.g. lasers, radio frequency, etc.).

As before, interface-portion (38) is placed flat against the appropriate surface of first structure (10) (as depicted in FIG. 2). The distance sensor is then activated (if not already active) to determine the distance to an adjacent structure and presents the distance data via distance-display (58). The tool (30) can then be moved along structure (10) until the desired gap between adjacent structures is achieved. Notably, electronic module (50) may include a left and a right distance sensor and display a left distance and a right distance and such sensors may be configured to activate simultaneously or one at a time. Simultaneous operation is useful to find the center point between two structures.

One of ordinary skill in the art will appreciate that electronic module (50) may be replaced with non-electronic sensors such as bubble levels and tape measures and telescoping rods. Additionally, other electronic modules or functions may be provided such as a "stud finder" function.

Method of Associating Attachment-Element

Referring now to FIG. 2 and FIG. 3, FIG. 2 presents one exemplary embodiment of a tool (30) being used to associate an attachment-element (20) with a first structure. Notably, no tool accessories are used by the currently preferred method. FIG. 3 shows the exemplary attachment-element (20) (joist hanger) after being associated with first structure (10). For the current exemplary method, attachment-element (20) is a joist hanger comprising a bottom plate (22) mechanically associated with a left side flange (23*a*), a right-side flange (23*b*) (referred to collectively as side flanges), and a left front plate (26-LFP) and a right front plate (26-RFP) extending perpendicularly from said flanges respectively.

First, an alignment mark is manually measured indicating the desired position along structure (10) to position joist hanger (20). Such measured location defines an "A"-axis location (alignment-mark (11)) on a structure where an attachment-element (20) is to be positioned. Second, a joist hanger (20) is associated with tool (30) so that the flanges are received by gap-setters (33). Restated, one configures a tool to receive an attachment-element (20) wherein said tool is associated with an alignment-element (32 or 32*b*) configured for being associated with an edge (alignment point, e.g. point 13, FIG. 2) defined by the first structure (10) thereby defining a B-axis location on structure (10) where said attachment-element is to be positioned. Using tool (30), the front plates (26) are brought in contact with a surface of first structure (10) (wall ledger for this example) and into alignment with alignment mark (11) as depicted in FIG. 2. The alignment-element (32) is then associated with the appropriate alignment point defined by structure (10). For the current example, the alignment point is first structure bottom edge (13). Front plates (26) are then secured to the surface of first structure (10) and tool (30) is removed as depicted in FIG. 3.

The next step is to insert an end of second structure (14) between the flanges of joist hanger (20) so the bottom edge of second structure (14) is adjacent to bottom plate (22). Flanges (26) are then secured to second structure (14).

It should be appreciated that the flange gap (25) is slightly larger than the width (17) of second structure (14) so that second structure (14) can be inserted into such flange gap so that the bottom defined by the second structure can rest on bottom plate (22) thereby minimizing the gap between the sides flanges of second structure (14) and aligning the first and second structure so that first structure top edge (12) is level with second structure top edge (16) as depicted in FIG. 1.

For tool (30) embodiments configured with an electronic measurement module (50), the method is the same as above except for the step of measuring a manual alignment mark. When an electronic measurement module (50) is used, carpenter (6) simply uses tool (30) to bring the front plates (26) in contact with a surface of first structure (10) and activates (if not already active) the distance measurement sensor to indicate the distance from an adjacent structure and moves joist hanger along the surface of first structure (10) until the desired distance is achieved. Then the carpenter uses the vertical alignment indicators to vertically align the joist hanger while the alignment-element is associated with the proper alignment point of structure (10). When the proper distance is indicated, and vertical alignment is indicated while the alignment-element is associated with the alignment point, the front plates (26) are secured to first structure (10). Next the second structure is associated with the joist hanger as before and secured in place. This method also allows the carpenter to easily establish a consistent non-zero grade if desired.

Adjustable Tool

As described above, FIG. 4 through FIG. 10 depicts a tool apparatus (30) that is one integral part including the alignment-element (32). Further, alignment-element (32) was configured to be associated with an alignment point such as the bottom edge of structure (10). Such a system works well for a plurality of second structures (14) where such second structures have uniform shape and dimensions. When the second structures are a joist, for example, and such plurality of joists where perhaps machined at different times, the widths and/or heights of such plurality of joists may vary. One of ordinary skill in the art will appreciated that such is a problem when the reference point is the bottom of the first structure (10) and it is the top edges of first structure (10) and second structure (14) that need to be level. Consequently, the next alternative embodiment shows an adjustable tool apparatus (30) defining an adjustable alignment-element (**32*b***).

Attention is now directed to FIG. 11 through FIG. 31 which presents one exemplary embodiment of an adjustable tool apparatus (30) for associating an attachment-element (20) to a first structure (10). As before, tool apparatus (30) comprises a handle-portion (36) and opposing interface-portion (38) wherein said handle-portion (36) defines a handle top end (**36*a*) and an opposing handle bottom end (36*b*) and wherein said interface-portion (38) defines an interface-top-end (38*a*) and an opposing interface-bottom-end (38*b***).

Figure 11:
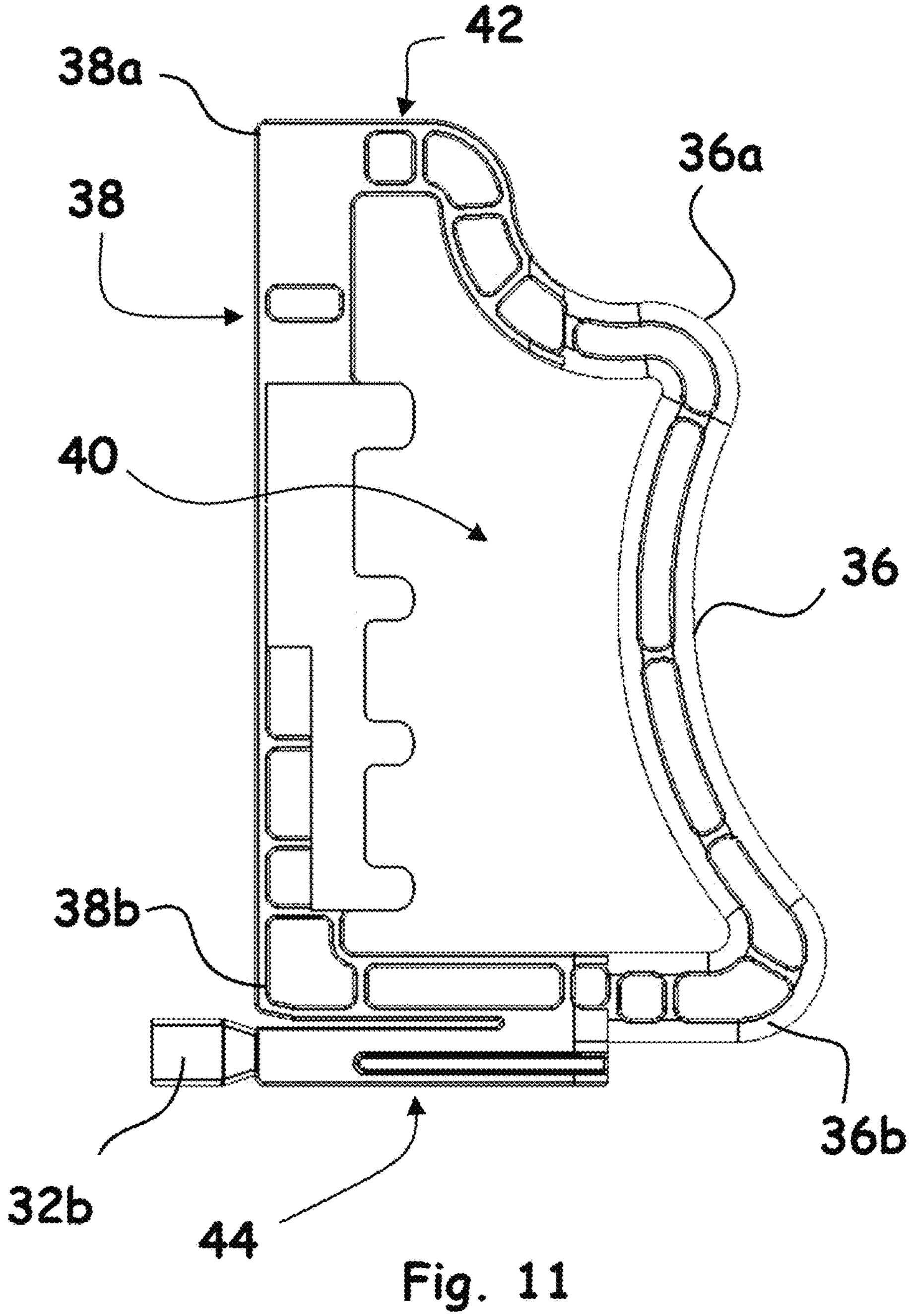
FIG. 11 is a left side elevation view of one alternative embodiment with an adjustment-element thereof.
Figure 12:
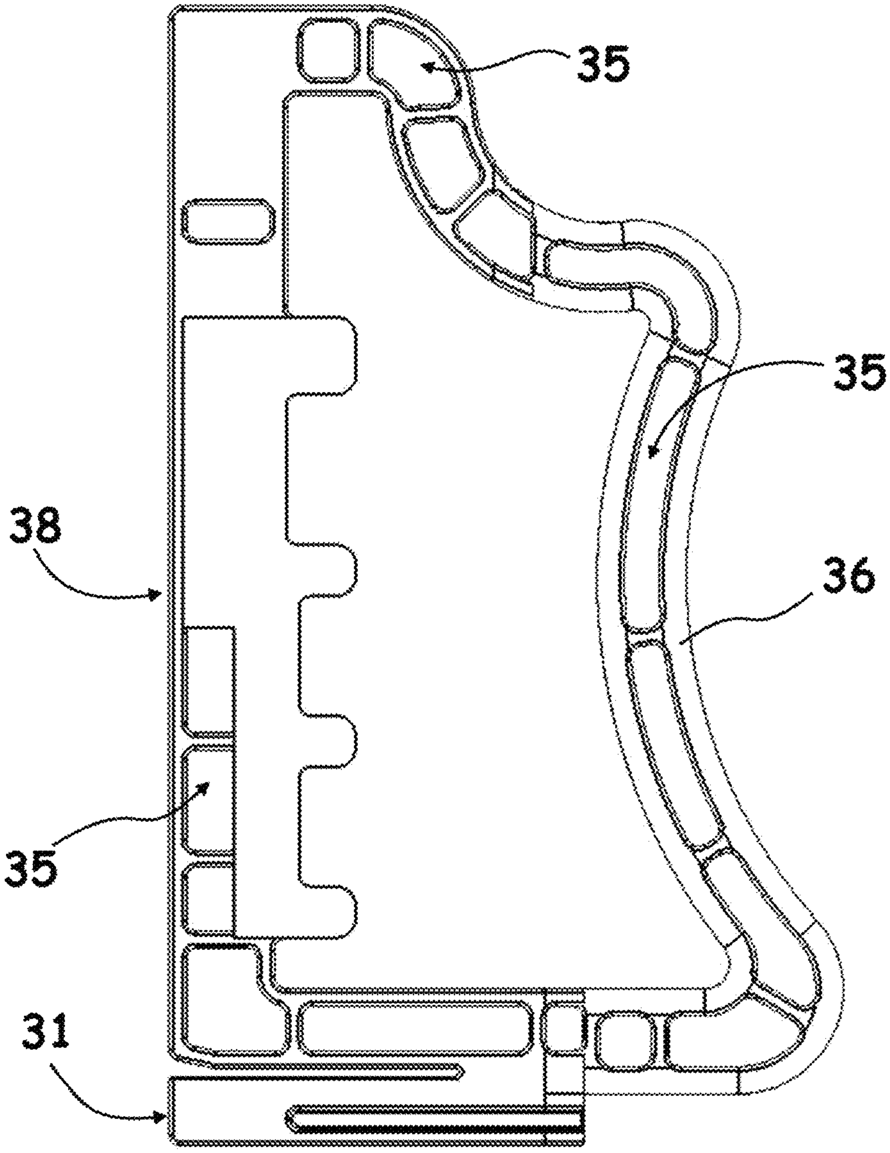
FIG. 12 is a left side elevation view of one alternative embodiment with the adjustment-element removed.
Figure 13:
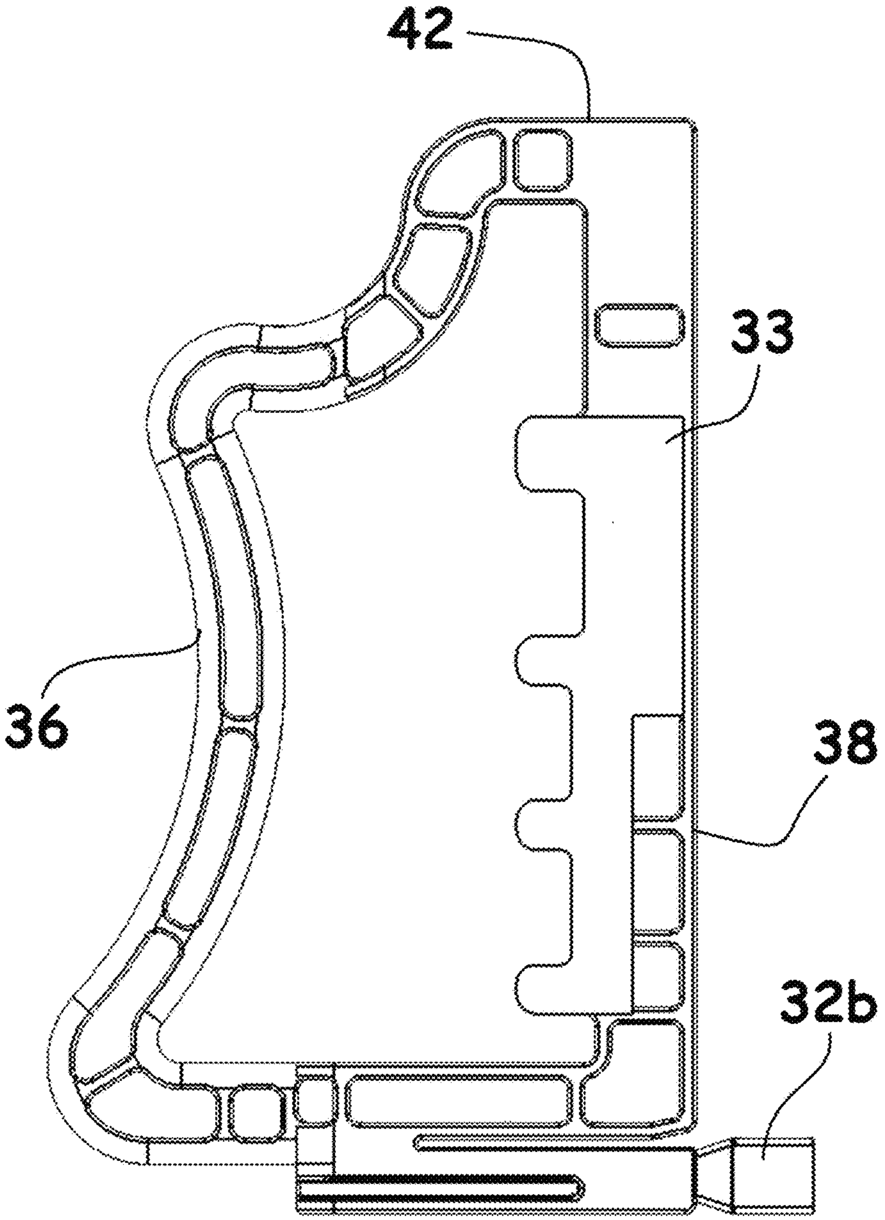
FIG. 13 is a right-side elevation view of one alternative embodiment with an adjustment-element thereof.

As before, tool apparatus (30) further comprises top-portion (42) and bottom-portion (44) wherein said top-portion (42) mechanically associates handle top end (**36*a*) to interface-top-end (38*a*) and bottom-portion (44) mechanically associates handle bottom end (36*b*) to the interface-bottom-end (38*b*). It should be noted that for the currently preferred embodiment top-portion (42) defines an “angular” section in contrast to the generally straight top-portion for the previous embodiment. As shown in FIG. 11, a tool-void (40**) is defined between the handle-portion, interface-portion, top-portion, and the bottom-portion.

As with the previous embodiments, at least one portion of the adjustable tool defines a portion void and preferably a plurality of portion-voids (35). Such portion-voids reduce the amount of material required to form tool (30) an also reduces the tool’s weight and provides provide storage and interface features.

Figure 23:
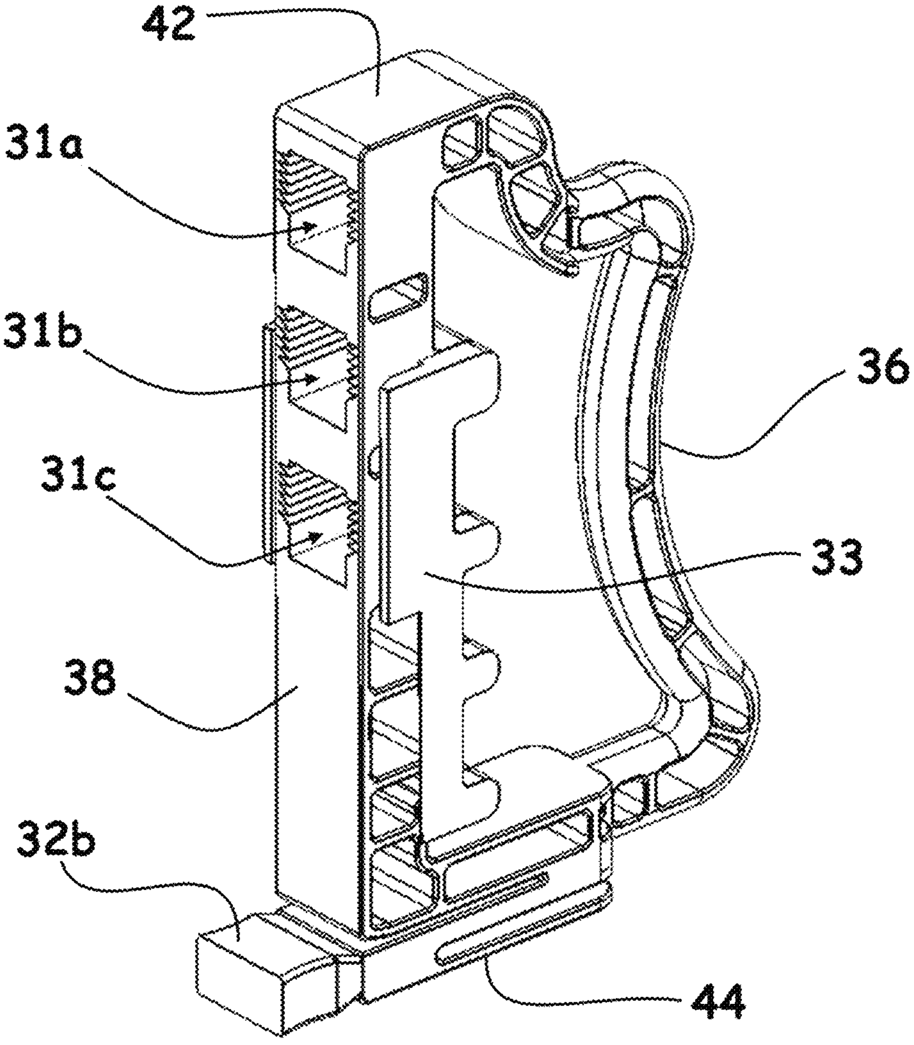
FIG. 23 is a front elevated perspective view of one alternative embodiment with an adjustment-element thereof.

For the adjustable tool apparatus (10) depicted in FIG. 11-FIG. 31, a removable alignment-element (**32*b*) is shown removably mechanically associated with alignment-element receiver (31, FIG. 16) defined by bottom-portion (44) and extends perpendicularly away from the interface-portion (38). Similarly, as best seen in FIG. 23-FIG. 24, interface-portion (38) defines a plurality of alignment-element-receivers (31*a*), (31*b*), and (31*c*) configured for releasably receiving an alignment-element (32*b*) configured to be releasably associated with any one of said plurality of alignment-element-receivers (31*a*-31*b***).

Figure 23B:
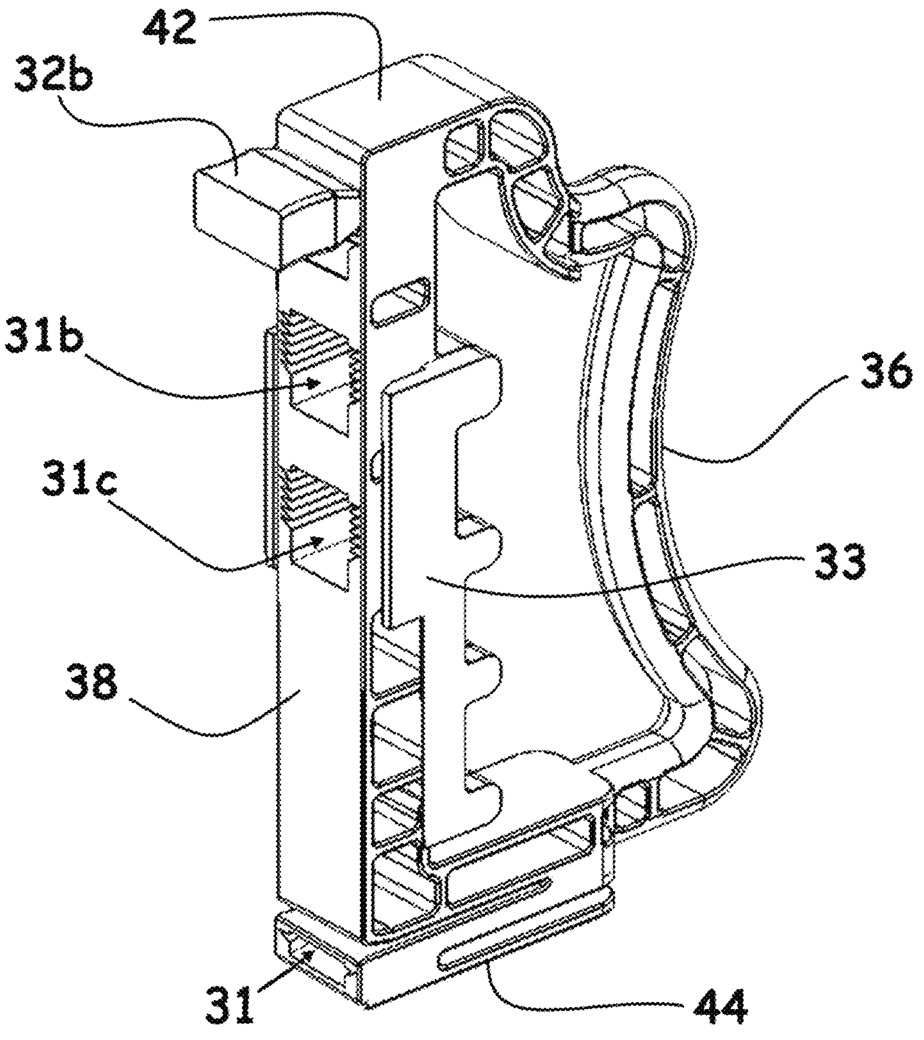

For example, FIG. **23*b* depicts an alignment-element (32*b*) associated with one of the alignment-element-receivers in group (31*a*). One of ordinary skill in the art will appreciated that for the configuration depicted in FIG. 23*b*, the reference point defined by structure (10) will be first structure top edge (12) instead of first structure bottom edge (13). Thus, attachment-element (20) will be associated with structure (10) referenced to top edge (12) so that any difference in second structure (14**) height causes no alignment error.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A tool for associating an attachment-element to a structure, said tool comprising:

a handle-portion and an opposing interface-portion wherein said handle-portion defines a handle top end and an opposing handle bottom end and wherein said interface-portion defines an interface-top-end and an opposing interface-bottom-end;

a gap setter configured for setting and holding the gap between opposing sides of said attachment-element;

a top-portion mechanically associating said handle top end to said interface-top-end;

a bottom-portion mechanically associating said handle bottom end to said interface-bottom-end wherein a tool-void is defined between said handle-portion, said interface-portion, said top-portion, and said bottom-portion; and an alignment-element that is one of (a) integral to said bottom-portion, (b) integral to said interface-portion, (c) mechanically associated with said bottom-portion, and (d) mechanically associated with said interface-portion.

2. A tool for associating an attachment-element to a structure as in claim 1, wherein said tool is defined by one integral component.

3. A tool for associating an attachment-element to a structure as in claim 1, further comprising a gap setter configured for setting the gap of opposing sides of said attachment-element.

4. A tool for associating an attachment-element to a structure as in claim 3, wherein said gap setter defines slots configured to receive flanges defined by said attachment-element.

5. A tool for associating an attachment-element to a structure as in claim 3, wherein said gap setter defines slots on opposing sides of said interface-portion configured to receive flanges defined by said attachment-element.

6. A tool for associating an attachment-element to a structure as in claim 5, wherein at least two of said handle-portion, said interface-portion, said top-portion, and said bottom-portion define a plurality of voids.

7. A tool for associating an attachment-element to a structure as in claim 6, wherein at least one of said handle-portion, said interface-portion, said top-portion, and said bottom-portion define are configured with at least one of (a) a magnetic element, and (b) a distance measuring element.

8. A tool for associating an attachment-element to a structure as in claim 6, wherein at least one of said handle-portion, said interface-portion, said top-portion, and said bottom portion is configured for receiving an electronic module configured for at least one of (a) providing leveling data, and (b) providing distance data.

9. An adjustable tool for associating an attachment-element to a structure, said adjustable tool comprising:

a handle-portion and an opposing interface-portion wherein said handle-portion defines a handle top end and an opposing handle bottom end and wherein said interface-portion defines a interface-top-end and an opposing interface-bottom-end;

a top-portion mechanically associating said handle top end to said interface-top-end;

a bottom-portion mechanically associating said handle bottom end to said interface-bottom-end wherein a tool-void is defined between said handle-portion, said interface-portion, said top-portion, and said bottom-portion;

wherein said interface-portion defines a plurality alignment-element-receivers each configured for releasably receiving an alignment-element; and an alignment-element that is releasably associated with one of said plurality of alignment-element-receivers.

10. An adjustable tool for associating an attachment-element to a structure as in claim 9, wherein said handle-portion, said interface-portion, said top-portion, and said bottom-portion define one integral component.

11. An adjustable tool for associating an attachment-element to a structure as in claim 9, further comprising a gap setter configured for setting the gap of opposing sides of said attachment-element.

12. An adjustable tool for associating an attachment-element to a structure as in claim 11, wherein said gap setter is mechanically associated with opposing sides of said interface-portion.

13. An adjustable tool for associating an attachment-element to a structure as in claim 4, wherein said attachment-element is a joist hanger comprising a bottom plate mechanically associated with a left side flange and a right side flange and wherein said gap setter receives said flanges and said bottom plate is in alignment with said bottom-portion when the attachment-element is associated with said tool.

14. An adjustable tool for associating an attachment-element to a structure as in claim 13, wherein one of said plurality of alignment-element-receivers is configured to receive said alignment-element so that the attachment-element is aligned with said structure referenced from a top edge of said structure.

15. An adjustable tool for associating an attachment-element to a structure as in claim 14, wherein at least one of said handle-portion, said interface-portion, said top-portion, and said bottom-portion define are configured with at least one of (a) a magnetic element, (b) a manual measuring element for providing one of leveling data and distance data, (c) an electronic measuring element configured for providing one of leveling data and distance data.

* * * * *